United States Patent
Squilla et al.

(10) Patent No.: US 6,623,528 B1
(45) Date of Patent: Sep. 23, 2003

(54) SYSTEM AND METHOD OF CONSTRUCTING A PHOTO ALBUM

(75) Inventors: John R. Squilla, Rochester, NY (US); Stephen L. Shaffer, Penfield, NY (US); John K. McBride, Rochester, NY (US); Charles F. Fitter, Jr., Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/120,648

(22) Filed: Jul. 22, 1998

(51) Int. Cl.⁷ .............................................. G06F 17/21
(52) U.S. Cl. ..................................................... 715/523
(58) Field of Search ............................. 355/40; 705/26, 705/27; 707/502, 526, 520; 715/502, 526, 520

(56) References Cited

U.S. PATENT DOCUMENTS

| | | | |
|---|---|---|---|
| 5,126,779 A | | 6/1992 | Maitani .................... 354/442 |
| 5,128,525 A | | 7/1992 | Stearns et al. ............. 235/454 |
| 5,274,418 A | * | 12/1993 | Kazami et al. .............. 355/40 |
| 5,285,438 A | | 2/1994 | Marchand et al. .......... 369/103 |
| 5,457,543 A | | 10/1995 | Maeda ....................... 358/401 |
| 5,636,292 A | | 6/1997 | Rhoads ...................... 382/232 |
| 5,784,149 A | * | 7/1998 | Kawaoka ..................... 355/35 |
| 5,784,461 A | | 7/1998 | Shaffer et al. ............... 380/21 |
| 5,799,219 A | * | 8/1998 | Moghadam et al. .......... 355/40 |
| 5,822,083 A | * | 10/1998 | Ito et al. .................... 358/403 |
| 5,825,467 A | * | 10/1998 | Narita ......................... 355/40 |
| 5,831,714 A | * | 11/1998 | Yoshikawa ................... 355/40 |
| 5,859,920 A | * | 1/1999 | Daly et al. .................. 382/115 |
| 5,907,391 A | * | 5/1999 | Kobayashi et al. ........... 355/40 |
| 5,934,777 A | * | 8/1999 | Patton et al. ................. 353/25 |
| 5,936,709 A | * | 8/1999 | Yamamoto ..................... 355/40 |
| 5,966,122 A | * | 10/1999 | Itoh ........................... 345/328 |
| 5,978,551 A | * | 11/1999 | Koyama ...................... 358/1.2 |
| 6,017,157 A | * | 1/2000 | Garfinkle et al. ............. 705/26 |
| 6,035,323 A | * | 3/2000 | Narayen et al. ............. 709/201 |
| 6,047,140 A | * | 4/2000 | Yoshikawa ................... 396/310 |

FOREIGN PATENT DOCUMENTS

| | | | | |
|---|---|---|---|---|
| EP | 0 773 665 A1 | | 5/1997 | .......... H04N/1/387 |
| JP | 3-274047 | * | 12/1991 | ............ G03C/5/08 |

OTHER PUBLICATIONS

Taniguchi, Nobyuki. Translation of JP 3–274047, Dec. 1991, by Ralph Mcelroy Trans. Co., pp. 1–67, Oct. 1998.*
"PhotoNet" by Picture Vision from website http://www.photonet.com.
Microsoft "Picture–It" from website http://www.wn.com.au.gol/computers/software–scene/Piclt.htm.
Kodak kiosk center from website http://home.kodak.com/kodakworld/news/html/kodakery/980423/980423_image_magic.html.

* cited by examiner

*Primary Examiner*—Stephen S. Hong
(74) *Attorney, Agent, or Firm*—James D. Leimbach; Susan L. Parulski

(57) ABSTRACT

A method of constructing a photo album including the steps of: providing a plurality of digital images; generating an index print of thumbnails from the digital images, the index print including a machine readable means for selecting one or more of images represented by the thumbnails to be included in the photo album; selecting one or more of the thumbnail images on the index print; reading the selected thumbnails from the index print with a scanner; and constructing a photo album from the digital images represented by the selected thumbnails.

17 Claims, 4 Drawing Sheets

SYSTEM AND METHOD OF CONSTRUCTING A PHOTO ALBUM

FIELD OF THE INVENTION

The invention relates generally to the field of photography, and in particular to photo collections. More specifically, the invention relates to a method of generating a photo album from an index print of customer's photographs.

BACKGROUND OF THE INVENTION

There are numerous types of photo albums within the prior art that include pictures arranged into a more easily viewed format that is more enjoyable than those kept in a box or an envelope. However, a great number of people who take photographs don't have the time, confidence or materials necessary to perform the task of setting up and creating photo albums.

Other prior art disclosures have taught the use of thumbnail sketches that are low resolution versions of images requiring less storage space than the full resolution versions. Picture-it software, by Eastman Kodak Company, teaches the creation of photo albums from digital thumbnails, and allows custom creations, and print at Kodak Kiosk™ centers. Picture-it software has a shortcoming. however, in that consumers must visit the Kiosk center and provide a digitized version of their images to the Kiosk center. Moreover, the thumbnail sketches used by a Kiosk center have no unique identifier prevent a broad access mechanism.

There exist within the prior art services provided, such as Photo-NetT™ by PictureVision™ that will scan photographs in a high-quality JPEG format and provide a thumbnail image of the scanned images on the internet. The consumer then selects the desired images to have prints made. Photo-Net™ has the shortcoming that the consumers are required to be computer literate and does not provide the great number of consumers a means by which they can select photographs to create photocollages and photo albums.

It should be apparent from the foregoing discussion that there remains a need within the art for a method by which consumers can create photocollages and photo albums in a manner that is as simple as ordering prints

SUMMARY OF THE INVENTION

The present invention addresses the foregoing discussed shortcomings in the prior art by creating an index print having a unique identifier so that a stored digital version of the image can be quickly accessed from a file. Accordingly, the present invention addresses the need for an improved method of generating photo albums from consumer photographs that requires a minimum amount of effort but yields a high-quality and is reasonably priced.

The present invention is directed to overcoming one or more of the problems set forth above. Briefly summarized, according to one aspect of the present invention, a method of constructing a photo album includes the steps of providing a plurality of images; generating an index print of thumbnails from the digital images, the index print including a machine readable means for selecting one or more of images represented by the thumbnails to be included in the photo album; selecting one or more of the thumbnail images on the index print; reading the selected thumbnails from the index print with a scanner; and constructing a photo album from the digital images represented by the selected thumbnails.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages: Allows the user to have (1) an easy method of choosing photos for creating professional looking albums, (2) duplication of albums, and (3) keeping album files for later use.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
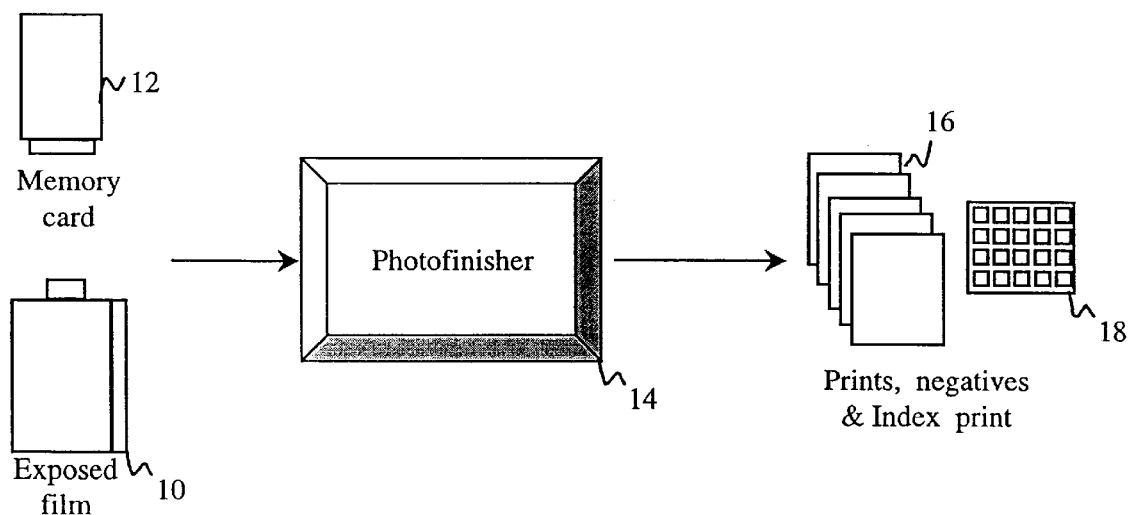
FIG. 1 is a block diagram showing the basic system elements to generate the index print useful for practicing the present invention.

We have discovered that a photo album or photocollage can be created in a simple and effective manner by supplying those consumers who take pictures with an index print of their developed pictures. Referring to FIG. 1, a consumer sends their roll of exposed film 10 or Digital Still Camera memory cards 12 to a photofinisher 14, and the customer receives a set of prints 16 and an index print 18 that is to be used as a selection tool. The index print 18 has a low resolution version (thumbnail) of each of the photographs taken and has a unique identifier for each of the thumbnails.

Figure 2:
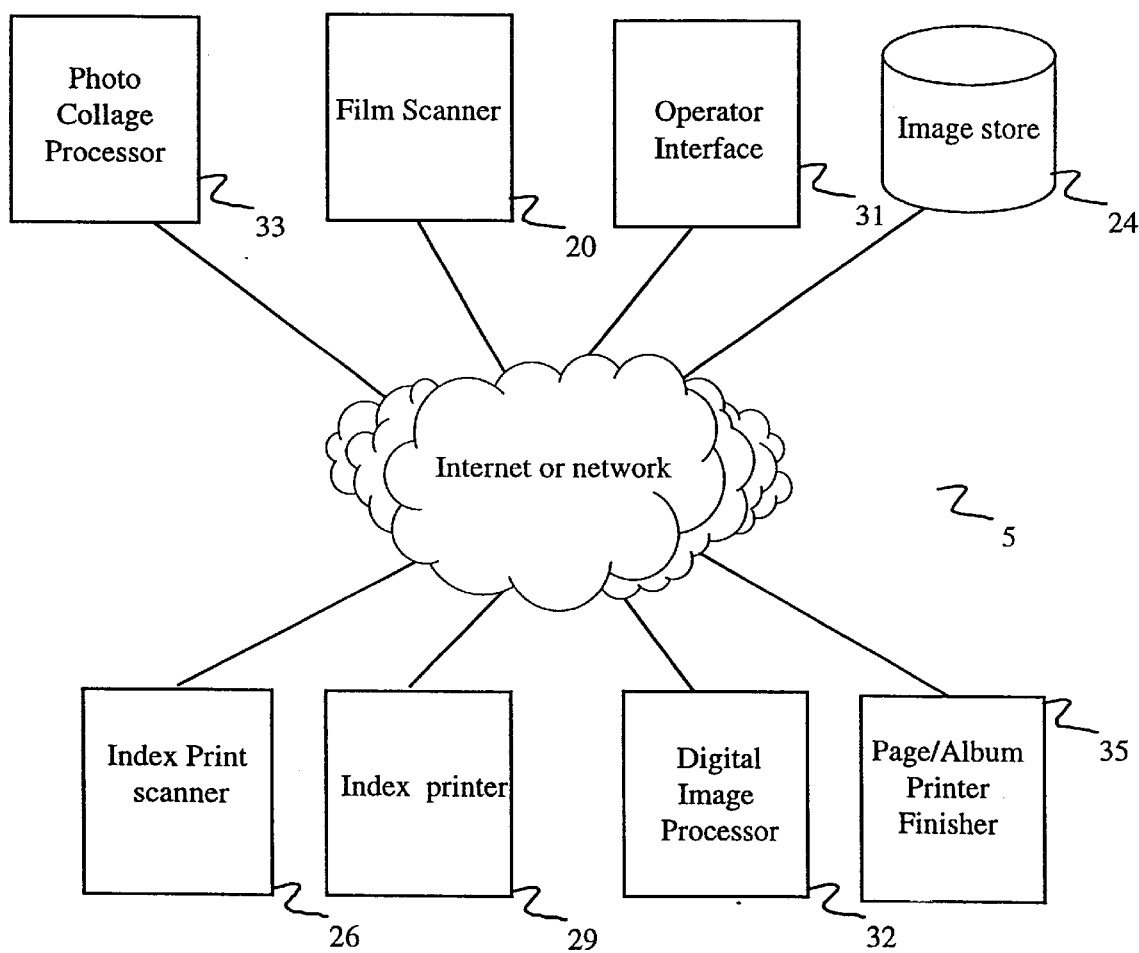
FIG. 2 is a system diagram showing a digital image processing system envisioned by the present invention.

Referring to FIG. 2, which is the system 5 as envisioned by the present invention, viewed in conjunction with FIG. 1, conventional film processing takes place with potential correction of exposed photographs via operator interface 31. Operator intervention typically takes place once exposed photographs are seen as having incorrect brightness or color content. A preferred system will have, in addition to the printing apparatus typically employed by a photofinisher, a film scanner 20. At the photofinisher 14, exposed film images are chemically processed to generate an optical image. These optical images are then scanned using the digital film scanner 20 to produce a high resolution digital file that is archived in an image store 24. In general to produce a high resolution printed image of 8×10 inch size a resolution of 1538×1024 pixels is required. The Digital still camera images are digitally processed to produce an equivalent digital image file of similar size. These digital images are then processed using a low-pass frequency filter and spatial sub-sampling to generate a thumbnail version approximately 384×256 pixels in size, as shown in the Flashpix toolkit on the Eastman Kodak World Wide Web site (www.kodak.com). These thumbnail images are used to form an index print by index printer 29 and printed on a paper media.

The high resolution images are archived in image storage 24 for future use. This archive of digital images would, in most cases, comprise a software database application and a large collection of optical or magnetic storage media. In order to allow for the future association of the high-resolution images with their corresponding low-resolution thumbnail images, each image is assigned a unique identifier. There are a variety of means, know in the art, for the generation of this unique identification. One such means is disclosed in Townsend and Shaffer, U.S. application Ser. No. 653,737 (which is commonly assigned with the present application for invention) in which a combination of the customer identification information and the photofinishing location, equipment, and date and time are combined. Other means of unique identification could be employed so long as they provide a one-to-one association of a person to a single image. The assigned unique image identification is associated with both the high and low resolution versions of the image.

Figure 3:
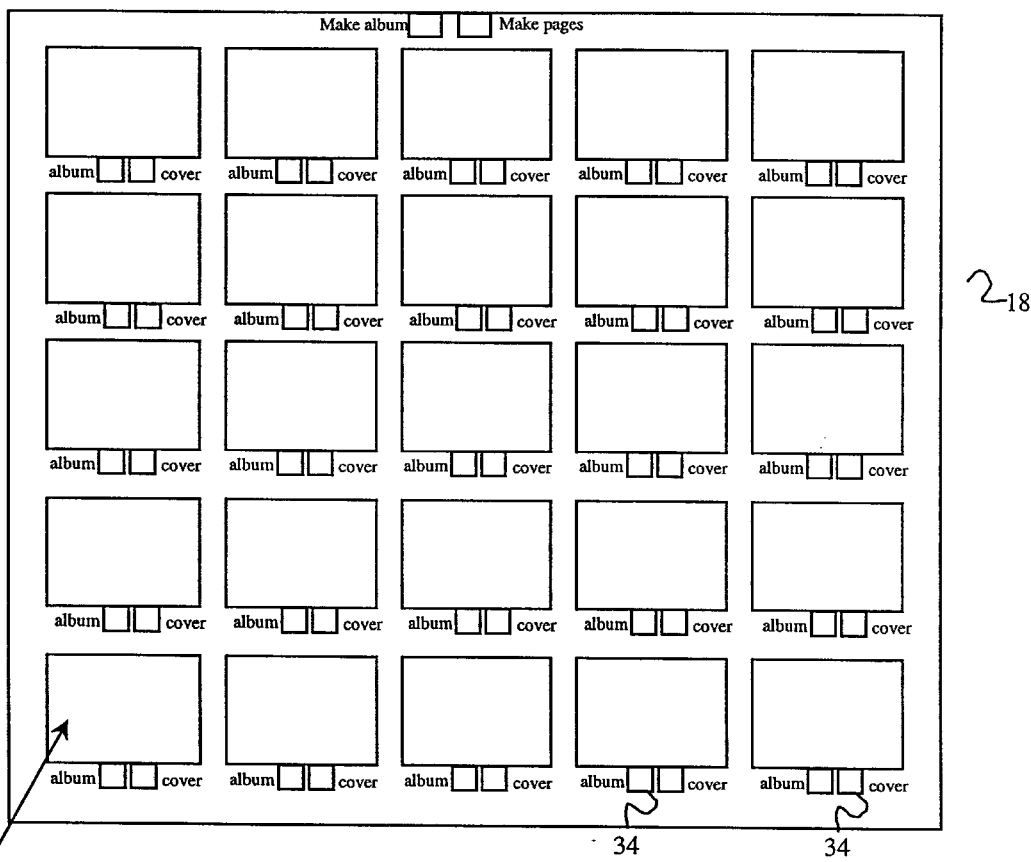
FIG. 3 is a schematic diagram showing an index print used with the present invention.

The low resolution, thumbnail images are further processed to generate a formatted array or index-print 18. Referring to FIG. 3, the index print 18 also includes a graphic depiction of a selection means for choosing the images to be used in a customer product such as an album (with or without an album cover). The customer product can also be other image documents such as greeting cards, stamps, posters or the like. The unique image identification is also included in the printed index print. In a preferred implementation this unique image identification is embedded directly into the pixels of the thumbnail image using signal processing techniques. An example of such techniques can be seen in Daly et al. (U.S. patent application Ser. No. 08/565,804).

The method of embedding digital data in an image can be best considered in its two stages; an encoding process and a decoding process. First, a multi-level data image is generated from digital data. The multi-level data image as described in detail below is an image having a constant background value and an array of spots on the background representing the digital data. The data image may be produced using digital image processing techniques, or may be produced optically for example by exposing spots on a photographic film.

Next, the data image is convolved with an encoding carrier image to form a frequency dispersed data image. The encoding carrier image is preferably a rotationally symmetric, low amplitude, high frequency pattern employed to spatially disperse the data image to mask its visibility when added to the source image. Preferably the convolution is performed on a digital computer using a well known Fourier Transform method and digital versions of the data image and the encoding carrier image. The convolution may also be performed using a direct convolution algorithm on the digital computer. Alternatively, the convolution may be performed optically using well known optical convolution techniques and optical versions of the data image and the encoding carrier image.

The frequency dispersed data image is then added to the source image to form a source image with embedded data. As described in more detail below, the addition may be performed either optically using traditional photographic processes, or digitally using a digital computer and digital versions of the source image and the frequency dispersed data image. If the addition is performed digitally, a hard copy version of the digital source image having embedded data may be produced using a digital printer such as a thermal, ink-jet, electrophotographic, or silver halide printer.

The digital data is recovered from the source image having embedded data by first cross correlating the source image having embedded data with a decoding carrier image to produce a recovered data image. Preferably, the decoding carrier image is identical to the encoding carrier image and the cross correlation is performed by a digital computer on digital versions of the source image having embedded data and the decoding carrier image. If a hard copy of the source image having embedded data is used, the hard copy is first scanned as described in detail below to produce a digital version. Alternatively, the cross correlation may be performed using well known optical techniques and optical versions of the source image having embedded data and the decoding carrier image.

Finally, the digital data is extracted from the recovered data image. Preferably, the digital data is extracted from a digital version of the recovered data image using a pattern recognition process in a digital computer. Alternative methods for encoding data within an image can be found in issued U.S. Pat. Nos.: 5,636,292; 5,128,525; 5,285,438; and 5,126,779 which can also be used with the present invention.

Alternatively, the image identification is printed adjacent to the thumbnail image on the index print in a human readable form. A customer indicates which images they want by checking a box 34 adjacent to the thumbnail image, or otherwise marking the thumbnail image on the index print for every image they want included in a photocollage such as a photo album. Alternatively, the user can place an "X" mark over the top of all images that they do not want included into an album. Once the selection has been made the consumer sends the marked index print to the photofinisher to have the photocollage prepared.

Again referring to FIG. 2, after receiving the index print 18 the customer uses the index print 18 to make selections of which images they want included in a photocollage. As used herein photocollage refers to a single page having a plurality of images, such as a page in a photoalbum, or a composite image having a number of images relating to a single theme such as a vacation, wedding, birthday party or the like. The concept of photocollage as used herein also includes the concept of a bound photo album having a plurality of pages, one or more of which is a photocollage. The photocollage is created when the customer sends in the index print 18 with the selections made by scanning the index print 18 using index print scanner 26 and generate a list of images to be used in the photocollage. Information about orders such as customer name quantity etc., are entered into the system via the operator interface 31 Using the generated list of images the photocollage processor 33 finds and retrieves the corresponding high resolution images that were previously stored in the image storage 24 which are associated with the unique image identification numbers that were supplied by the scanned index print 18. These high resolution images are then assembled into a photocollage such as an album page layout using a page description language or template following graphical rules. These graphical rules incorporate customer preferences such as number of images per page, size of the pages, background styles and colors, etc. In this page layout process it may be necessary to zoom and crop the images to optimize the layout or to match customer preferences. The photocollage pages are then assembled and rendered by the digital image processor 32 and printed via the page/album printer-finisher 35. A well known image processing software application such as Quark Xpress© or Adobe Photoshop© is used for these functions.

FIG. 2 illustrates the preferred embodiment of the present invention wherein each of the components has an interface to either the internet or some other network. The individual components need to individually reside on the same network. Certain components will exist at the photofinishers such as the index printer, the film scanner 20. Other subsets of system 5 would exist at multiple locations such as having a print shop with the page/album printer finisher 35 and a remote processing site providing services for the digital image processor 32.

Figure 4:
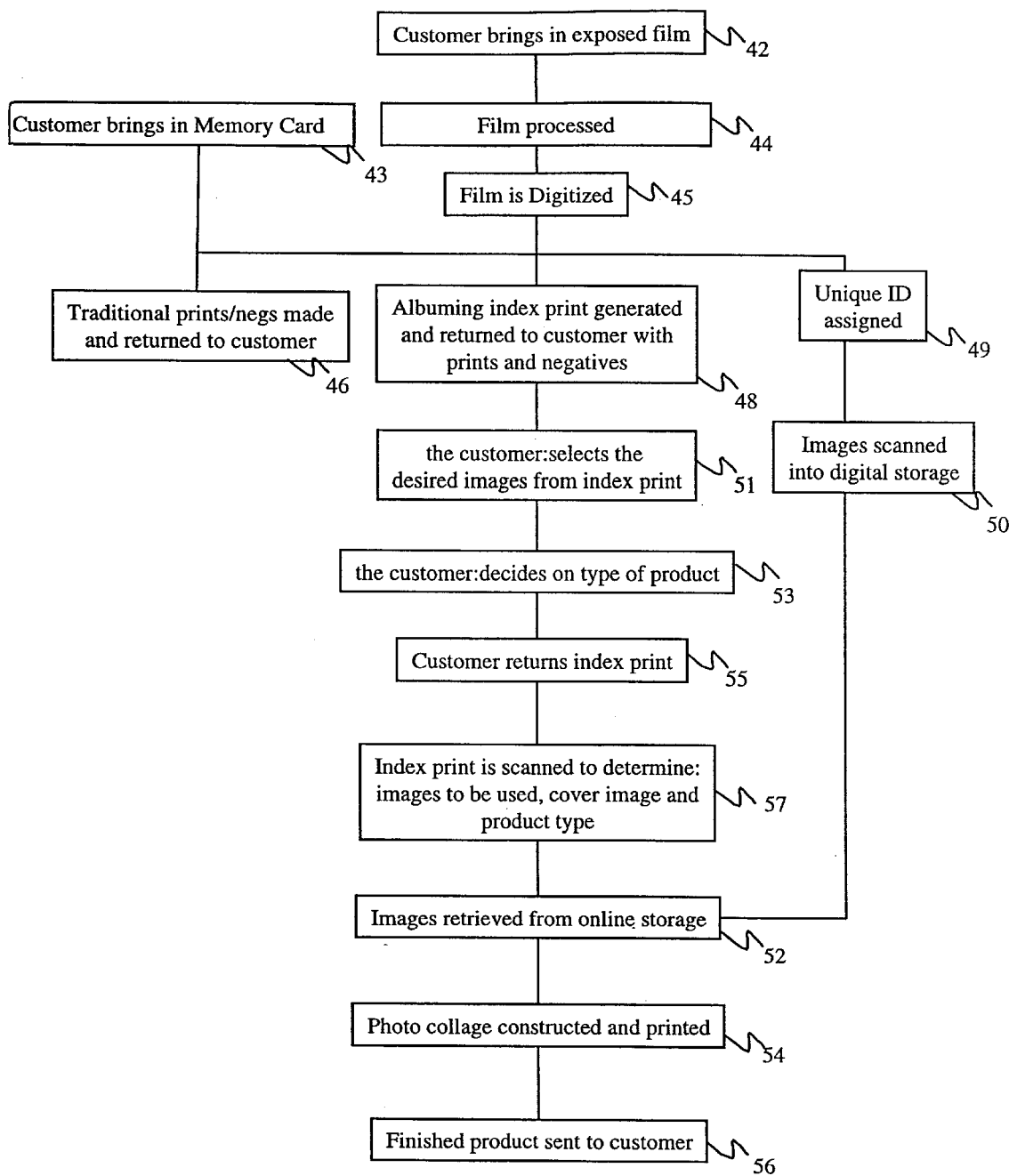
FIG. 4 is a flow chart showing the steps performed in the method of the present invention.

Referring to FIG. 4, which illustrates the process steps that are performed from developing photographs to generation of photocollages. The customer brings in exposed film 42 or a memory card from a digital camera 43 containing images that are to be made into a photocollage. The photofinisher generates traditional prints 46 for the customer. In the case of film, the film is scanned 45 to create a digital image. Once acquired, the digital images are assigned a unique ID 49 and placed into digital storage 50. An index print 18 is generated 48 which is sent to customer for selection of images to be used in the photocollage. The index print 18 can be sent to the customer along with their prints. The customer selects the desired images 51 from the index print 18 and also selects the type of product 53 from a standard order form supplied with index print 18. The customer then returns the index print to the retailer 55 where the index print is scanned with the index print scanner 26 to determine what images are to be used in the photocollage, the cover image, and the product type 57. The unique identifiers from the images are then associated with the images stored in the online storage facility and these full scale images are retrieved 52. The photocollage is then constructed and printed 54 and sent to the customer 56.

For those cases where the consumer sends the printed index print 18 to place the album order, an operator scans the index print using the index print scanner 26. This scanned image of the index print is then processed to locate and find the marks used by the customer to select images for album creation. Algorithms employed to locate and interpret such hand written marks are known in the optical character recognition art. In addition to processing the selection marks on the index print the scanned index print image is further processed to extract each selected image identification number. Depending upon the method employed for rendering the image identification number within the index print a variety of image processing techniques would be employed. In the case of human readable image identification numbers optical character recognition software is employed that translates the scanned image of the characters to a digital number representation. In the case where the image identification was hidden within the pixels of the thumbnail image, a reverse of the data embedding signal processing technique is employed. The images are processed to remove any rotation and scale variations introduced in the printing and scanning steps. The result of this processing is to generate a list of the identification numbers of the images which the customer desires to have placed into the photocollage.

The method communication the selection of the thumbnails on an index print further comprise the provision of electronic communication means for transmitting the contents of the index print including: a touch-tone phone, a facsimile transmission, or a touchpad.

The unique identifier can be any of either: embedded data contained within the pixels themselves, invisible ink, visible codes, histogram, or color information.

The invention has been described with reference to a preferred embodiment. However, it will be appreciated that variations and modifications can be effected by a person of ordinary skill in the art without departing from the scope of the invention.

Parts List 5 internet or network
10 exposed film
12 memory cards
14 photofinisher
16 prints
18 index prints
20 film scanner
24 image storage
26 index print scanner
29 index printer
31 operator interface
32 digital image processor
33 photocollage processor
34 box
35 printer finisher
42 exposed film
43 digital camera
45 film digitization
49 unique ID
50 digital storage
51 images
53 product

What is claimed is:

1. A method of constructing a photo collage, comprising:
   a) providing a plurality of high resolution digital images;
   b) storing the high resolution digital images;
   c) generating an index print of low resolution thumbnails representing the digital images, the index print including a means for uniquely identifying each of the thumbnails and for selecting one or more of the thumbnail images to be included in the photo collage, the index print being in the form of a hard copy;
   d) selecting one or more of the thumbnail images using the index
   e) communicating the selection of thumbnails from the index print
   f) associating the thumbnails with the stored digital images via the means for uniquely identifying; and
   g) constructing the photocollage from the digital images represented by the selected thumbnails.

2. The method of constructing a photocollage claimed in claim 1, wherein the means for uniquely identifying each of the thumbnails is a machine readable code and wherein the steps of communication the selection, associating the thumbnails with the stored digital image files and constructing the photocollage are performed automatically.

3. The method claimed in claim 2, wherein the means for selecting an image to be included in the photocollage includes a box associated with each thumbnail image adapted to be checked by a customer.

4. The method claimed in claim 3, wherein the means for uniquely identifying the selected image includes data embedded in the thumbnail image.

5. The method claimed in claim 3, wherein the means for uniquely identifying the selected image is a bar code associated with the thumbnail image.

6. The method claimed in claim 1, wherein the photocollage is a digital data file.

7. A method of constructing a photo collage, comprising:
   a) providing a plurality of high resolution digital images;
   b) storing the high resolution digital images;
   c) generating a low resolution thumbnail for each of the digital images, the thumbnail having a unique identifier on each of the thumbnails that associates the thumbnail with its respective high resolution image;

d) providing a hardcopy index print comprising the thumbnails and adapted to receive visual marks;

e) providing means for manually selecting one or more of the thumbnails by manually inserting visual marks on the index print which indicates the selected one or more thumbnails; and f) constructing the photocollage from the stored digital images represented by the selected thumbnails.

8. The method of claim 7 further comprising the step of associating the thumbnail images with the stored digital images.

9. The method of claim 8 wherein the unique identifier supplied with each of the thumbnails is a machine readable code and wherein the steps of associating the thumbnails with the stored digital image files and constructing the photocollage are performed automatically.

10. The method claimed in claim 7, wherein the unique identifier includes data embedded in the thumbnail image.

11. The method of claim 7, wherein the unique identifier further comprises a bar code associated with the thumbnail image.

12. The method of claim 7 wherein the photocollage is a digital data file.

13. The method of claim 7 wherein the providing means for selection step further comprises providing a check box for each of the thumbnail images.

14. The method of claim 7 wherein the providing means for selection step further comprises providing at least one area near each of the thumbnails to be used in conjunction with each of the thumbnail images to select that thumbnail.

15. The method of claim 7 further comprising the step of providing electronic communication means for transmitting the contents of the index print.

16. The method of claim 15 wherein the step of providing communication means further comprises providing one of the following: a touch-tone phone, a facsimile transmission, or a touchpad.

17. The method of claim 7 wherein the generating step further comprises selecting the unique identifier from one of the following: embedded data, invisible ink, visible codes, or color information.

* * * * *